Dec. 2, 1952     C. R. TURNER     2,619,982
PRESSURE RELIEF PLUG FOR PRESSURE COOKERS
Filed June 6, 1946
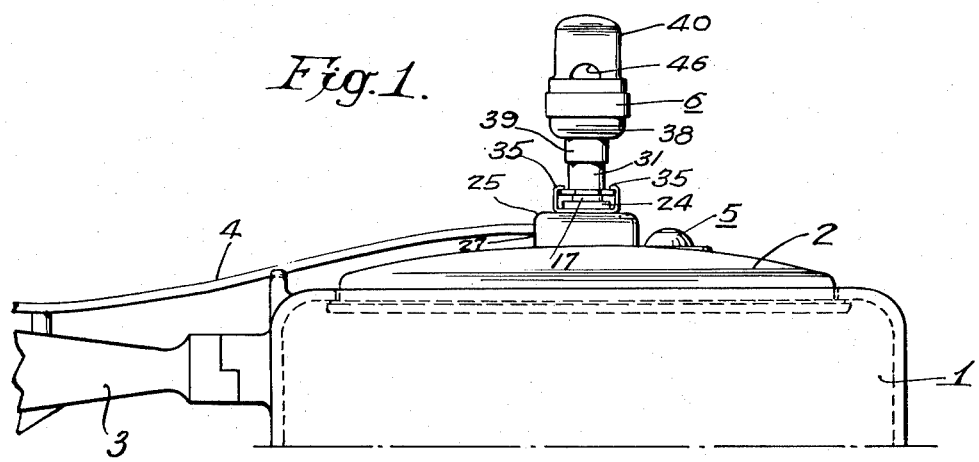
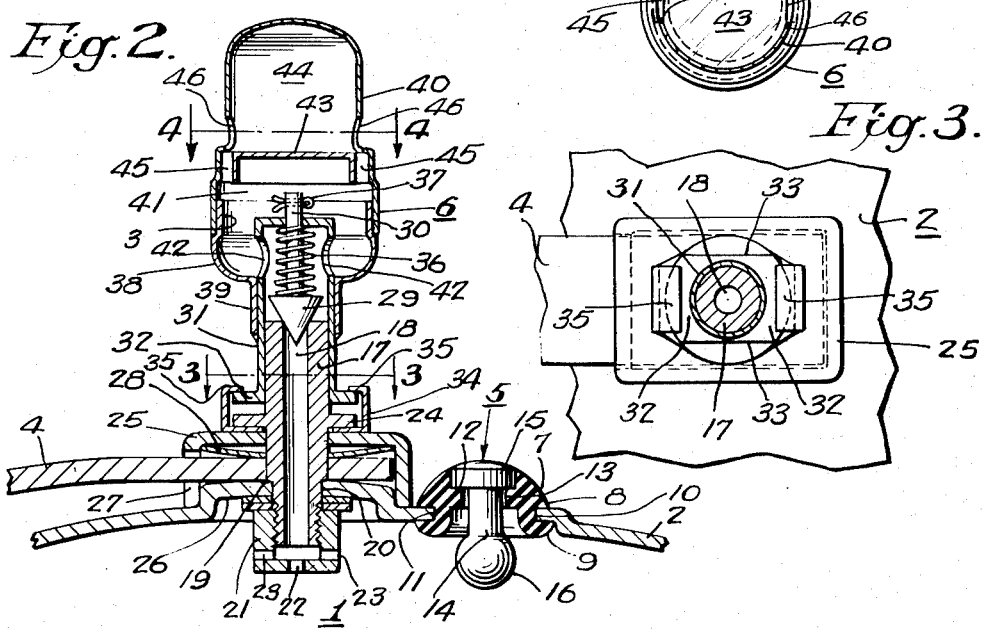
Inventor:—
Charles Roger Turner
by his Attorneys
Howson & Howson Patented Dec. 2, 1952

2,619,982

UNITED STATES PATENT OFFICE 2,619,982

PRESSURE RELIEF PLUG FOR PRESSURE COOKERS

Charles Roger Turner, Enfield, Springfield Township, Montgomery County, Pa., assignor to Proctor Electric Company, Philadelphia, Pa., a corporation of Pennsylvania Application June 6, 1946, Serial No. 674,707

6 Claims. (Cl. 137—467)

This invention relates to pressure cookers, and more particularly to the control and indication of pressure in such a cooker.

In the operation of a pressure cooker, heat is first applied thereto at a relatively high rate to bring the cooker rapidly to the operating conditions, i. e. proper cooking temperature and pressure, and the user should then reduce the heat input and commence the timing of the cooking operation. At the end of the cooking operation, the heat input is interrupted and the pressure within the cooker is reduced, after which the lid or cover is removed.

For proper operation, it is essential that the air be vented or removed from the cooker before commencement of the cooking operation, and that the user be apprized when the cooker has been brought to the operating condition. It is also essential that the user be apprized of the pressure condition within the cooker, especially after the cooking operation has terminated. It is further necessary that adequate means be provided for preventing the development of dangerous pressure within the cooker.

In many instances where pressure indication is involved, it has been common practice to provide a pressure indicating gauge and to provide some form of safety device to prevent the development of dangerous pressures. While pressure gauges are generally satisfactory and have been widely used, they are not entirely satisfactory when applied to pressure cooking devices. Experience has shown that most pressure cooker gauges are expensive, fragile and inaccurate, and their presence is psychologically conducive to fear of explosion. Moreover, they require that the user of a pressure cooker devote careful and watchful attention during the preliminary heating of the cooker.

One object of the present invention is to provide inexpensive, reliable and accurate means for performing the above-mentioned functions in a pressure cooker.

Another object of the invention is to provide means which eliminate the need for a pressure gauge and hence eliminate its attending disadvantages and objections.

Still another object of the invention is the provision of a novel air venting device which indicates the pressure condition within the cooker and which also serves as a pop-off valve to prevent a dangerously high pressure within the cooker.

Other objects and features of the invention will be apparent from the following detailed description of the invention with reference to the accompanying drawings, in which, Fig. 1 is an elevational view of the upper portion of a pressure cooker embodying the invention;

Fig. 2 is an enlarged sectional view showing the device provided by this invention;

Fig. 3 is a detail sectional view taken along line 3—3 of Fig. 2; and

Fig. 4 is a detail sectional view taken along line 4—4 of Fig. 2.

Referring first to Fig. 1, there is shown a portion of a pressure cooker comprising a vessel 1 having a top opening, and a lid or cover 2 adapted to seat upwardly in the said opening. The vessel 1 has a handle 3, and the lid 2 has a handle 4. Preferably the vessel and lid construction are of the form shown and claimed in copending application Serial No. 672,363 filed May 27, 1946, and which has issued as Patent No. 2,570,993 dated October 9, 1951. Since the present invention is not concerned with the general structure of the pressure cooker, there is no need to illustrate or describe such structure in detail.

In accordance with the present invention, there is provided on the lid 2 of the pressure cooker a device 5, preferably in cooperative association with a second device 6. For convenience, the device 6 is disposed at the central portion of the lid, while the device 5 is disposed adjacent to the device 6. The device 5 is a venting and indicating device which is adapted to effect discharge or removal of air from the cooker and to indicate visually whether or not substantial pressure exists within the cooker. The device 6 is a pressure control and indicator device which is adapted to maintain the correct operating pressure in the cooker and to give an audible indication of continued application of excess heat to the cooker.

Referring specifically to the device 5, in the form thereof shown, there is provided a resilient seating and retaining member 7 (Fig. 2) which is generally of annular form and which has the cross-sectional shape shown. This member may be formed of synthetic rubber or other suitable material. It is formed so as to provide peripheral retaining portions 8 and 9 between which is an annular recess 10. The lid 2 has a suitable opening 11 within which the resilient member 7 may be positioned, the annular edge portion of the lid about said opening seating in recess 10, while portions 8 and 9 engage the upper and lower surfaces of said edge portion.

The resilient member 7 also has an internal inwardly-extending annular projection 12, in which there is provided an opening 13. A rigid member 14, which may be formed of metal or other rigid material, is loosely supported by the resilient member 7, as shown. The rigid member 14 has an enlarged upper portion 15 which normally seats on the upper surface of the annular seating portion 12, while the lower part 16 of member 14 is substantially of spherical form. The diameter of the spherical portion 16 is such that when member 14 rises under the influence of pressure within vessel 1 as hereinafter described, the said member is retained by the resilient member 7, but in the event of excessive pressure within vessel 1, the member 14 will be forcibly ejected through the opening of the resilient retaining member.

Referring now to the device 6, as shown in Fig. 2, there is provided a stud 17 which is secured to the lid 2 and which has an axial passage 18 therethrough adapted to communicate with the interior of the vessel 1 when the lid is in place. The lower portion of stud 17 is of reduced diameter to form a shoulder 19, and the said portion extends through an opening 20 in lid 2 and is threaded to receive a nut 21. The latter is preferably cup-shaped and has bottom and side openings 22 and 23 which communicate with the passage 18.

The stud 17 removably supports the other elements of device 6 as will be presently described, and the stud may also serve to secure the inner end of handle 4 to the lid. The stud 17 has an integral flange 24 below which there is a cap 25 adapted to seat over a raised portion 26 of the lid 2 and having a recess or opening 27 through which the handle 4 extends. The stud 17 extends through openings in the cap 25 and the end portion of handle 4, and the latter is tightly held by a spring disk or washer 28 within the cap 25.

The upper end of passage 18 serves as a valve seat for a valve member 29 which is in the form of an inverted cone. The member 29 has a stem 30 by means of which it is movably supported by a hollow tubular member or sleeve 31. The latter has a flange 32 at its lower end which has flat sides 33, as shown in Fig. 3. A retainer 34 is held between flange 24 and cap 25, and has upwardly extending bent fingers 35 which are adapted to engage the flange 32.

The upper end of sleeve 31 is closed except for an opening through which the stem 30 extends. Within the upper part of the sleeve there is provided a spring 36 whose upper end engages the top of sleeve 31 and whose lower end engages the valve member 29. The spring serves to retain the sleeve 31 in place and it also serves to seat the valve member 29 while permitting the latter to rise under pressure. The valve member is prevented from becoming detached from sleeve 31 by a cotter pin 37 at the end of stem 30.

The sleeve 31 is readily removable simply by turning it until the flat edges 33 are adjacent the ends of fingers 35, at which time the sleeve is released and may be lifted from the stud 17. The replacement of the sleeve merely involves inserting it with the flat edges 33 properly positioned and then turning it to effect engagement on the fingers 35 with the flange 32. The spring 36 urges the sleeve 31 upward so as to maintain the flange 32 in engagement with fingers 35.

A cup-shaped member 38 is permanently secured to sleeve 31, having an extending tubular portion 39 which embraces and is secured to the sleeve. A dome or cap 40 is removably carried by the cup-shaped member 38, and together these elements form a chamber 41. The upper portion of sleeve 31 has openings 42 leading to the chamber 41. Within the dome 40 there is a partition 43 above which is an upper chamber 44. Adjacent the partition 43 are diametrically opposed passages 45 which communicate with openings 46 leading to the outside of the dome 40. The structure just described constitutes a whistle which is designed to emit a whistling sound only when a substantial volume of steam is emitted through openings 42, passages 45 and openings 46, as set forth in the following description of the complete operation.

The functions of the devices 5 and 6, and the manner in which they cooperate to perform the desired functions, may best be understood by considering the operation of the pressure cooker. Let use assume that the cooker has just been placed in operation, and that heat is being applied thereto at a relatively high rate to bring the cooker rapidly to the desired operating condition, as previously mentioned. The movable parts of devices 5 and 6 are then in their normal positions, as shown in Fig. 2. As soon as the water inside the vessel 1 commences to boil, the generated steam forces the air out of the vessel through the venting device 5. The spaces or clearances about the member 14 permit the air to escape. In a very short time after the attainment of boiling temperature (usually from 30 to 60 seconds), steam is generated in such volume as to cause sufficient pressure within the vessel 1 to raise the member 14, at which time the enlarged spherical end 16 engages the lower edge of the annular projection 12 and effects therewith a complete sealing of the venting opening. This action of device 5 permits subsequent operation of device 6.

Upon the attainment of the desired cooking pressure, a small volume of steam escapes through the device 6 raising the valve member 29 slightly, and the escaping steam serves as a visual indication to the user that the heat input should be reduced and the timing of the cooking operation should be commenced. In the event that the user is preoccupied or is out of the room at that time, an increase in the volume of escaping steam causes an audible whistling sound to be emitted, which warns the user that heat is being wasted and that the water in the vessel is being boiled away too rapidly. When the user reduces the heat input, the whistling ceases. Thus the device 6 first gives a visual indication and then gives an audible indication that the user should reduce the head input and commence timing the cooking operation. The device 6 also relieves the pressure within the cooker and maintains the correct cooking pressure during the cooking operation.

At the end of the cooking time, the cooking operation is terminated by interrupting the heat supply, and the user then takes steps to reduce the pressure within the vessel 1. Experience has shown that the safest and easiest way for the average user to do this is to hold the cooker under water running from a faucet or to set it in a pan which is partly filled with water. The temperature within the vessel 1 is rapidly reduced thereby, and consequently the pressure within the vessel decreases to approximately atmospheric pressure, at which time the member 14 is permitted to drop to its normal position. This indicates to the user that it is time to remove the lid or cover 2. Thus the novel venting device 5 provides a positive indication as to whether or not substantial pressure exists within the cooker.

In the event of failure of the pressure regulating valve device 6 to maintain a safe pressure within the cooker during operation, due to plugging of the valve or some other condition, the member 14 will be forcibly ejected when the pressure on it exceeds the holding strength of the resilient retainer 7. In other words, the spherical portion 16 of member 14 will be forced through the opening 11. Thus the device 5 also serves as a safety device to prevent the development of dangerous pressures within the cooker, in addition to its previously-mentioned functions.

It will be apparent that the weight of member 14 should be such that it will rise at the proper time, and the spring 36 should exert such pressure on the valve member 29 that the latter will not rise until the desired cooking pressure has been attained.

It will be seen from the foregoing description that the devices 5 and 6 cooperate to provide satisfactory and reliable pressure indication and control, as well as to eliminate the necessity for handling the control valve during the cooking operation. The two devices, in combination, provide all of the necessary functions; they are simple and positive in operation; and they facilitate and insure proper operation of the pressure cooker.

While certain preferred forms of the devices 5 and 6 have been shown and described, it will be apparent that the invention is not limited thereto but contemplates various other forms and modifications.

I claim:

1. In a pressure cooker having an air-vent and pressure-relief opening, an apertured resilient member retained in said opening and having an aperture-defining portion capable of resisting significant deformation by the normal cooking pressure existing in said cooker during operation but deformable by excessive pressures that may arise in the cooker, a rigid member freely supported by said resilient member and movable by pressures in said cooker, a sealing portion on said rigid member of a size and configuration to seat against said aperture-defining portion in response to the normal cooking pressure and to force itself through said aperture by deforming said aperture-defining portion in response to excessive pressure, and an indicating portion on said rigid member extending from said sealing portion within said aperture and projectable outwardly beyond said resilient member when said sealing portion seats against said aperture-defining portion, the projection of said indicating portion serving to indicate the existence of pressure in said cooker.

2. In a device according to claim 1, said aperture-defining portion comprising an inwardly-extending flange which is relatively thin compared to the retaining portion of said resilient member.

3. In a device according to claim 1, said resilient member having lips engaging the edge defining said opening.

4. In a pressure cooker having an air-vent and pressure-relief opening, an apertured resilient member retained in said opening and having an aperture-defining portion capable of resisting significant deformation by the normal cooking pressure existing in said cooker during operation but deformable by excessive pressures that may arise in the cooker, a rigid member freely supported by said resilient member and movable by pressures in said cooker, a sealing portion on said rigid member of a size and configuration to seat against said aperture-defining portion in response to the normal cooking pressure and to force itself through said aperture by deforming said aperture-defining portion in response to excessive pressure, and an indicating portion on said rigid member extending from said sealing portion within said aperture and projectable outwardly beyond said resilient member when said sealing portion seats against said aperture-defining portion, the projection of said indicating portion serving to indicate the existence of pressure in said cooker, said indicating portion including a stop further serving to prevent said rigid member from becoming disengaged from said resilient member when pressure does not exist in said cooker.

5. In a device according to claim 4, said aperture-defining portion comprising an inwardly-extending flange which is relatively thin compared to the retaining portion of said resilient member.

6. In a device according to claim 4, said resilient member having lips engaging the edge defining said opening.

CHARLES ROGER TURNER.

REFERENCES CITED

The following references are of record in the file of this patent:

UNITED STATES PATENTS

| Number | Name | Date |
| --- | --- | --- |
| 305,047 | Carr | Sept. 16, 1884 |
| 967,954 | Morrison et al. | Aug. 23, 1910 |
| 1,958,590 | Peirce | May 15, 1934 |
| 2,106,671 | Watson | Jan. 25, 1938 |
| 2,276,502 | McCoy | Mar. 17, 1942 |
| 2,297,378 | Wittenberg | Sept. 29, 1942 |
| 2,301,724 | Vischer | Nov. 10, 1942 |
| 2,403,691 | States | July 9, 1946 |
| 2,428,483 | Wittenberg | Oct. 7, 1947 |
| 2,429,149 | Wittenberg | Oct. 14, 1947 |

FOREIGN PATENTS

| Number | Country | Date |
| --- | --- | --- |
| 17,146 | Great Britain | of 1894 |